Sept. 22, 1953     R. M. NELDEN     2,652,689
ROTARY HYDRAULIC COUPLING HAVING ADJUSTABLE OVERFLOW
WEIR DETERMINING THE EXTENT OF FILL THEREOF
Filed Aug. 9, 1947
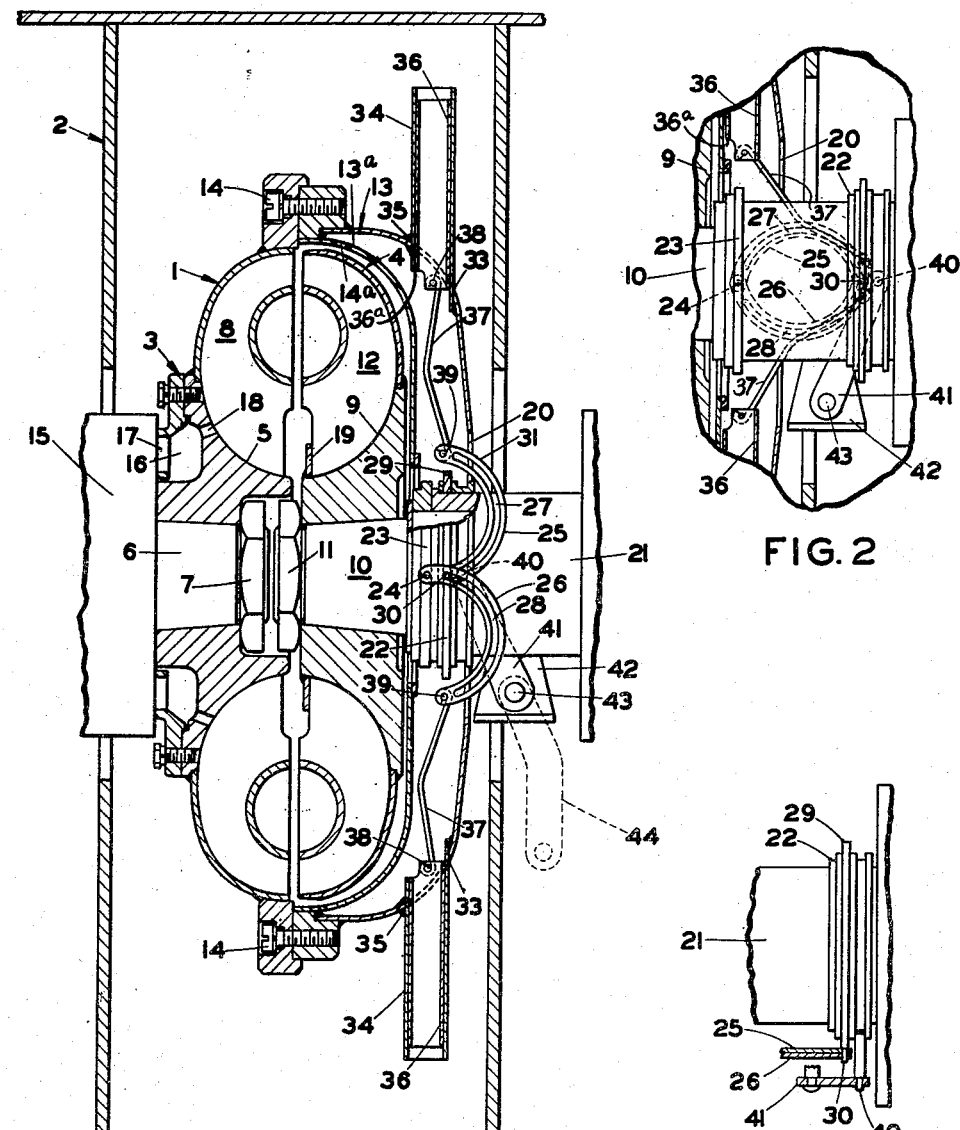
INVENTOR.
Richard M. Nelden
BY
Andrew K. Foulds
his ATTORNEY

Patented Sept. 22, 1953

2,652,689

UNITED STATES PATENT OFFICE

2,652,689

ROTARY HYDRAULIC COUPLING HAVING ADJUSTABLE OVERFLOW WEIR DETERMINING THE EXTENT OF FILL THEREOF

Richard M. Nelden, Detroit, Mich., assignor to American Blower Corporation, Dearborn, Mich., a corporation of Delaware Application August 9, 1947, Serial No. 767,732

4 Claims. (Cl. 60—54)

This invention relates to new and useful improvements in hydraulic couplings.

One of the objects of this invention is to provide a new and improved hydraulic coupling.

Another object is to provide an improved means for adjusting the speed of a hydraulic coupling.

Another object is to provide a hydraulic coupling the speed of which may be quickly and efficiently varied.

Other objects will become apparent from time to time throughout the specification and claims as hereinafter related.

In the accompanying drawing, to be taken as a part of the specification, there is clearly and fully illustrated a preferred embodiment of this invention, in which drawing:

Figure 1 is a view in vertical section of a hydraulic coupling having an adjustable hollow overflow member for varying the level of liquid and controlling the coupling speed, Fig. 2 is a detail view in elevation of the actuating means for the adjustable overflow member of Fig. 1 and shows the actuating means in a fully operated position, and Fig. 3 is a detail plan view of the actuating arms of Fig. 2 showing the rotary clearance between the same.

Referring to the drawing by character of reference there is a hydraulic coupling 1 enclosed in a housing 2. The coupling 1 comprises an impeller 3 and a runner 4. The impeller 3 comprises a body member 5 which is secured on a driving shaft 6 by a nut 7 and a vane portion 8 which is operable to transmit thrust to the liquid circulating through the coupling. The runner 4 comprises a body portion 9 secured to a shaft 10 by a nut 11 and a vane portion 12 which is operable to transmit the thrust imparted to the hydraulic liquid by the impeller 3. There is an outer casing 13 and inner casing 13ª which are secured to the impeller 3 by a plurality of bolts 14 and are rotatable therewith. The inner casing 13ª has a plurality of apertures 14ª therein which permit flow of liquid from the space enclosed by the runner 4 and impeller 3 to the space enclosed by the casings 13 and 13ª. The impeller shaft 6 is rotatably supported in a stationary bearing member 15 which has one or more bores or passageways (not shown) therethrough for supplying liquid to the coupling. The impeller body member 5 has a chamber portion 16 therein with an inlet port 17 and an outlet port 18 for receiving liquid from the passageways in the bearing member 15 and supplying the same to the space enclosed between the impeller and runner. The runner body member 9 has an annular ring member 19 secured thereto along the edges of the vane member 12 which is operable to reduce vibration and surging of liquid supplied to the coupling. The casing 13 has an axial aperture 20 therethrough through which extends the runner shaft 10. The runner shaft 10 is rotatably supported by a stationary bearing member 21 on which is slidably mounted a collar member 22. The runner shaft 10 has a collar member 23 secured thereto and rotatable therewith as an integral part thereof. The runner shaft collar member 23 has a pivot pin 24 thereon to which are pivotally secured two semi-circular cam members 25 and 26 which have semi-circular slots 27 and 28 therein respectively. The slidable collar 22 has an annular ring member 29 thereon which has a pin or cam follower member 30 which rides in the slots 27 and 28 of the cam members 25 and 26 and is operable upon lateral movement to move the end portions 31 and 32 of the cam members 25 and 26 together. The casing 13 has a pair of diametrically opposed apertures 33 therein through which are positioned hollow cylindrical guide members 34 which extend substantially radially of the runner shaft 10. The guide members 34 are secured to the casing 13 by welding as at 35. Positioned in the guide members 34 are hollow cylindrical overflow members 36 which are operable to have reciprocal motion therein. The members 36 are secured to the end portions 31 and 32 of the cam members 25 and 26 by bent connecting rods 37 which are secured to the members 36 by connecting pins 38 and to the cam members 25 and 26 by connecting pins 39. The slidable collar member 22 has a projecting pin portion 40 to which is movably secured a lever member 41. The lever member 41 is carried by a bracket member 42 and has a shaft 43 which extends external of the housing 2 where it is operated by a lever member 44.

In operation this coupling functions as follows:

When the impeller 3 is set in motion and liquid is supplied through the passageways in the bearing member 15 and the chamber 16 and inlet passageway 18 of the impeller body member 5 to provide a working circuit of liquid between the impeller 3 and runner 4 which is operable to transmit kinetic energy therebetween. Liquid from the space enclosed between the impeller 3 and runner 4 will enter by way of ports 14ª into the space enclosed between the casings 13 and 13a and establish a level of liquid therein which will determine the amount of liquid in the working circuit between the impeller 3 and runner 4. The amount of liquid or effective level of liquid in the working circuit will vary directly with the level of liquid in the casing 13 measured radially inward. The movable tubes or overflow members 36 are of a size sufficient for overflow and removal from the casing 13 of any amount of liquid supplied thereto for discharge. The apertures 14a are of a sufficient size to permit free circulation of liquid to the space enclosed by the casing 13 during normal circulation and are restrictive only against abnormal rates of flow such as might be caused by surging when a high torque load is suddenly applied to the runner shaft. The overflow members 36 each have an edge or lip portion 36a over which the liquid flows for discharge through the members 36. In any given position of the members 36 the level of liquid in the casing 13 (as measured radially inward) will correspond substantially to the position of the lip 36a as all liquid above (radially inward from) that level will overflow and be discharged through the members 36. In the position indicated in Fig. 1 the members are fully extended outward and the coupling is substantially empty. In this position the liquid is discharging from the casing 13 through the members 36 as fast as it is entering the coupling through the apertures 18. As the members 36 are moved radially inward the level of liquid in the casing 13 must rise to the level of the lip 36a before liquid can discharge from the coupling and the working circuit is filled thereby in direct proportion. When the members 36 are moved to their maximum inward position as indicated in Fig. 2 the coupling will be filled with its maximum capacity of liquid and will be operating with a minimum amount of slippage between the impeller and runner. It should be noted at this point that the most common way to vary the speed of the runner of a hydraulic coupling without varying the speed of the impeller is to vary the extent of liquid fill thereof to vary the degree of slippage between the runner and impeller. As the amount of slippage is increased or decreased the speed of the runner will vary inversely. If when the coupling is in a filled or partially filled condition the members 36 are moved outward to a new position the members 36 will at first be submerged or partially submerged according to the rapidity with which they are moved. The excess liquid above (radially inward from) the lip 36a will be discharged through the members 36 until the liquid level is decreased to correspond to the new position of the overflow members, at which point inflow through ports 18 will again be balanced by outflow through the members 36. Since the drainage of liquid from the space enclosed by the casing 13 is almost instantaneous the adjustment of the amount of liquid in the working circuit between the impeller 3 and runner will likewise be almost instantaneous so that a wide range of adjustment of the speed of the runner 4 may be had with only a short inertial time lag. The adjustment of the overflow members 36 is accomplished by movement of the lever 44 on the outside of the housing 2 which is operable to move the lever 41 and with it the slidable collar member 22. When the slidable collar member 22 is moved away from the runner 4 the pin 30 moves along therewith drawing the cam members 25 and 26 together and thus moving the overflow members 36 radially inward. Movement of the collar member 22 toward the runner 4 will correspondingly move the overflow members 36 outward. In Fig. 2 the collar member 22 is shown in its position of maximum distance from the runner 4 with the cam members 25 and 26 moved completely together and the overflow members 36 at their maximum inward position for maximum fill of the coupling. In Fig. 3 a detailed view is shown of the construction of the collar member 22 to show the clearance between the lever 41 and the cam members 25 and 26 when the cam members are rotating with the casing 13.

The liquid discharge from the coupling through the overflow members 36 will collect in the bottom portion of the housing 2 where it will be circulated through a cooler unit, if necessary, by a pump (not shown), and returned to the coupling through the passageways in the bearing member 15. It should be noted that this type of coupling gives a quick response for varying the speed thereof, a quality which has been lacking in couplings heretofore produced.

If it should be desired to use this form of coupling for constant speed operation the cam members and adjustment linkage could be eliminated and the overflow members 36 set at a constant predetermined position depending upon the conditions of operation desired. Since the overflow members 36 function merely as weirs for determining the depth of liquid in the casing 13 they could be eliminated for constant speed couplings and the depth of liquid fill be determined by controlling the height of the wall of the casing 13 as measured radially inward. If the overflow members 36 were eliminated, discharge of liquid from the casing 13 would be directly over the edge of the wall thereof and a constant level of liquid would be maintained at the level of the inner edge of the casing wall.

There are many forms and variations of the fundamental idea of this invention which might be used to accomplish the same purpose without departing from the scope of this disclosure.

What is claimed and is desired to be secured by Letters Patent of the United States is:

1. A hydraulic coupling comprising an impeller, a runner, a casing rotatable with said impeller, said impeller and said runner being operable to enclose a working circuit of liquid for transfer of kinetic energy therebetween, said casing extending radially toward the axis of rotation to form a chamber for receiving liquid from said working circuit, a passageway substantially at the outer periphery of said casing interconnecting said working circuit and said chamber for conduction of liquid therebetween, means for conducting liquid to said working circuit, said casing having an aperture substantially at the outer periphery thereof, a hollow cylindrical guide member positioned in said aperture, an open ended hollow cylindrical overflow member positioned for reciprocal movement in said guide member and opening therethrough for discharge of liquid from said chamber, the inner end of said overflow member being movable into said chamber to determine the amount of liquid in said working circuit by determining the depth of liquid in said chamber and at which the same will overflow for discharge therethrough, and a mechanical linkage connected to said overflow member and operable to adjust the radial position of the same in said guide member to vary the radial position of said inner end relative to said aperture.

2. In a hydraulic coupling, an impeller and impeller shaft, a runner and runner shaft, a casing attached to and rotatable with said impeller, said impeller and said runner being operable to enclose a working circuit of liquid for transfer of kinetic energy therebetween, said casing extending radially toward the axis of rotation to form a chamber for receiving liquid from said working circuit, a passageway substantially at the outer periphery of said casing interconnecting said working circuit and said chamber for conduction of liquid therebetween, means for conducting liquid to said working circuit, the amount of liquid in said working circuit varying directly with the amount of liquid in said chamber, said casing having an aperture substantially at the outer periphery thereof, a hollow cylindrical guide member positioned in said aperture and extending substantially radially of said runner shaft, an open ended hollow cylindrical overflow member positioned for reciprocal movement in said guide member and opening therethrough for discharge of liquid from said chamber, the inner end of said overflow member being movable into said chamber to determine the depth of liquid in said chamber at which liquid will overflow thereinto for discharge, said casing having an axial aperture through which extends said runner shaft, a bearing sleeve for carrying said runner shaft and extending into said axial aperture, a longitudinally slidable collar member carried by said runner shaft bearing sleeve, a cam member carried by runner shaft and engaging a cam follower pin on said collar member, a linkage arm operatively connecting said movable overflow member to said cam member, a lever member engaging said collar member and operable to move the same, and said collar member being operable upon movement to move said cam member and to move said overflow member radially thereby to determine the depth of liquid in said chamber.

3. A hydraulic coupling, comprising an impeller, a runner, a casing rotatable with said impeller, said impeller and said runner being operable to enclose a working circuit of liquid for transfer of kinetic energy therebetween, said casing extending radially toward the axis of rotation to form a chamber for receiving liquid from said working circuit, a passageway substantially at the outer periphery of said casing interconnecting said working circuit and said chamber for conducting liquid therebetween, means for conducting liquid to said working circuit, outlet means for discharging liquid from the outer periphery of said chamber and operable to determine the level of liquid in said chamber and the amount of liquid in said working circuit, said outlet means comprising an aperture through the wall of said casing at or adjacent the periphery thereof, an open ended tubular member movably connected to said casing at said aperture for discharging liquid from said chamber, said tubular member having one end extending radially inward from said aperture, the radial inward extent of said one end of said tubular member relative to said aperture determining the depth of liquid in said chamber at which excess liquid will discharge through said tubular member, and means for moving said one end of said tubular member radially of said coupling to determine the inward extent thereof relative to said aperture.

4. A hydraulic coupling comprising an impeller, a runner, a casing rotatable with said impeller, said impeller and said runner being operable to enclose a working circuit of liquid for transfer of kinetic energy therebetween, said casing extending radially toward the axis of rotation to form a chamber for receiving liquid from said working circuit, a passageway substantially at the outer periphery of said casing interconnecting said working circuit and said chamber for conducting liquid therebetween, means for conducting liquid to said working circuit, outlet means for discharging liquid from the outer periphery of said chamber and operable to determine the level of liquid in said chamber and the amount of liquid in said working circuit, said outlet means comprising an aperture through the wall of said casing at or adjacent the periphery thereof, a hollow cylindrical member positioned in and opening through said aperture and movable radially of said casing, the inward extent of the inner end of said cylindrical member being operable to determine the depth of fill of said chamber at which excess liquid will begin to discharge through said cylindrical member and said aperture, and means to adjust the position of said cylindrical member radially of said casing to vary the extent of fill thereof.

RICHARD M. NELDEN.

References Cited in the file of this patent
UNITED STATES PATENTS

| Number | Name | Date |
|---|---|---|
| 1,583,735 | Nydqvist | May 4, 1926 |
| 2,187,656 | Kiep et al. | Jan. 16, 1940 |
| 2,299,883 | Dunn | Oct. 27, 1942 |
| 2,385,263 | Ericson et al. | Sept. 18, 1945 |
| 2,491,483 | Dolza et al. | Dec. 20, 1949 |
| 2,557,894 | Siesel | June 19, 1951 |